(12) United States Patent
Inoue et al.

(10) Patent No.: US 11,800,071 B2
(45) Date of Patent: Oct. 24, 2023

(54) CONTROL DEVICE, PROJECTION APPARATUS, CONTROL METHOD, AND CONTROL PROGRAM

(71) Applicant: FUJIFILM Corporation, Tokyo (JP)

(72) Inventors: Kazuki Inoue, Saitama (JP); Akihiro Ishizuka, Saitama (JP); Tomonori Masuda, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 17/733,357

(22) Filed: Apr. 29, 2022

(65) Prior Publication Data

US 2022/0264063 A1    Aug. 18, 2022

Related U.S. Application Data (63) Continuation of application No. PCT/JP2020/040506, filed on Oct. 28, 2020.

(30) Foreign Application Priority Data

Oct. 31, 2019    (JP) ................................ 2019-198646

(51) Int. Cl.
     *H04N 9/31*        (2006.01)
     *G03B 21/14*       (2006.01)

(52) U.S. Cl.
     CPC ......... *H04N 9/3147* (2013.01); *H04N 9/3185* (2013.01); *H04N 9/3188* (2013.01)

(58) Field of Classification Search
     CPC .. H04N 9/3147; H04N 9/3188; H04N 9/3185; H04N 9/3179; G03B 21/14; G03B 21/147; G06F 3/042
     See application file for complete search history.

(56) References Cited

U.S. PATENT DOCUMENTS

2016/0261819 A1    9/2016   Mizushiro

FOREIGN PATENT DOCUMENTS

| JP | 2015-109527 A | | 6/2015 |
|---|---|---|---|
| JP | 2015103880 A | * | 6/2015 |

(Continued)

OTHER PUBLICATIONS

International Preliminary Report on Patentability for International Application No. PCT/JP2020/040506, dated Oct. 7, 2021.

(Continued)

*Primary Examiner* — Ryan D Howard
(74) *Attorney, Agent, or Firm* — Birch, Stewart, Kolasch & Birch, LLP (57) ABSTRACT

A projection system includes a set of a first projection apparatus and a first imaging unit and a set of a second projection apparatus and a second imaging unit. A first projection range of the first projection apparatus and a second projection range of the second projection apparatus have an overlapping part. A control device of the projection system determines whether or not an operation for an operating part projected to the overlapping part is performed based on a captured image of the first projection range and a captured image of the second projection range, and executes a predetermined control in a case where it is determined that the operation is performed.

32 Claims, 9 Drawing Sheets

(56) References Cited

FOREIGN PATENT DOCUMENTS

| | | |
|---|---|---|
| JP | 2016-161752 A | 9/2016 |
| JP | 2017-191973 A | 10/2017 |
| JP | 2017-191974 A | 10/2017 |

OTHER PUBLICATIONS

International Search Report for International Application No. PCT/JP2020/040506, dated Jan. 12, 2021, with English translation.
Japanese Office Action for corresponding Japanese Application No. 2021-553667, dated May 16, 2023, with English translation.

* cited by examiner

CONTROL DEVICE, PROJECTION APPARATUS, CONTROL METHOD, AND CONTROL PROGRAM

CROSS REFERENCE TO RELATED APPLICATION

This is a continuation of International Application No. PCT/JP2020/040506 filed on Oct. 28, 2020, and claims priority from Japanese Patent Application No. 2019-198646 filed on Oct. 31, 2019, the entire disclosures of which are incorporated herein by reference.

BACKGROUND OF THE INVENTION

1. Field of the Invention

The present invention relates to a control device of a projection system, a projection apparatus, a control method, and a computer readable medium storing a control program.

2. Description of the Related Art

A system that includes a plurality of sets of a projection unit and an imaging unit and implements large screen projection by causing images to partially overlap with each other from the projection unit of each set has been known (for example, refer to JP2017-191973A and JP2015-109527A).

SUMMARY OF THE INVENTION

In a system that performs large screen display using a plurality of projection units, projection ranges of the projection units overlap with each other. A configuration of displaying an operating part for providing an instruction for switching or the like of an image subjected to the large screen display in an overlapping part of the projection ranges is considered. In this configuration, the operating part is imaged by imaging units that image the projection ranges, respectively. Thus, research is necessary in order to detect whether or not the operating part is operated by a user with high accuracy. Displaying the operating part in the overlapping part of the projection ranges is not considered in JP2017-191973A and JP2015-109527A.

The present invention is conceived in view of the above matter, and an object thereof is to provide a control device of a projection system, a projection apparatus, a control method, and a computer readable medium storing a control program that can detect an operation of providing an instruction to execute a predetermined control by a user with high accuracy.

A control device according to an aspect of the present invention is a control device of a projection system including a plurality of projection units and a plurality of imaging units that image a projection range of each of the plurality of projection units, the projection range of each of the plurality of projection units including an overlapping part partially overlapping with the projection range of other projection unit, the control device comprising an operation detection unit that detects an operation of providing an instruction to execute a predetermined control from an image of the overlapping part imaged by the imaging unit, and a control unit that executes the predetermined control in response to the operation detection unit detecting the operation, in which the overlapping part is imaged by the plurality of imaging units that image the overlapping part in common at different timings.

A control method according to another aspect of the present invention is a control method of a projection system including a plurality of projection units and a plurality of imaging units that image a projection range of each of the plurality of projection units, the projection range of each of the plurality of projection units including an overlapping part partially overlapping with the projection range of other projection unit, the control method comprising an imaging step of imaging the overlapping part in common by the plurality of imaging units at different timings, an operation detection step of detecting an operation of providing an instruction to execute a predetermined control from an image of the overlapping part captured, and a control step of executing the predetermined control in response to the operation being detected in the operation detection step.

A non-transitory computer readable medium storing a control program according to still another aspect of the present invention is a non-transitory computer readable medium storing a control program of a projection system including a plurality of projection units and a plurality of imaging units that image a projection range of each of the plurality of projection units, the projection range of each of the plurality of projection units including an overlapping part partially overlapping with the projection range of other projection unit, the control program causing a computer to execute an imaging step of imaging the overlapping part in common by the plurality of imaging units at different timings, an operation detection step of detecting an operation of providing an instruction to execute a predetermined control from an image of the overlapping part captured, and a control step of executing the predetermined control in response to the operation being detected in the operation detection step.

According to the present invention, a control device of a projection system, a projection apparatus, a control method, and a computer readable medium storing a control program that can detect an operation of providing an instruction to execute a predetermined control by a user with high accuracy can be provided.

DESCRIPTION OF THE PREFERRED EMBODIMENTS

Hereinafter, a projection system including an embodiment of a control device according to the present invention will be described with reference to the drawings.

Figure 1:
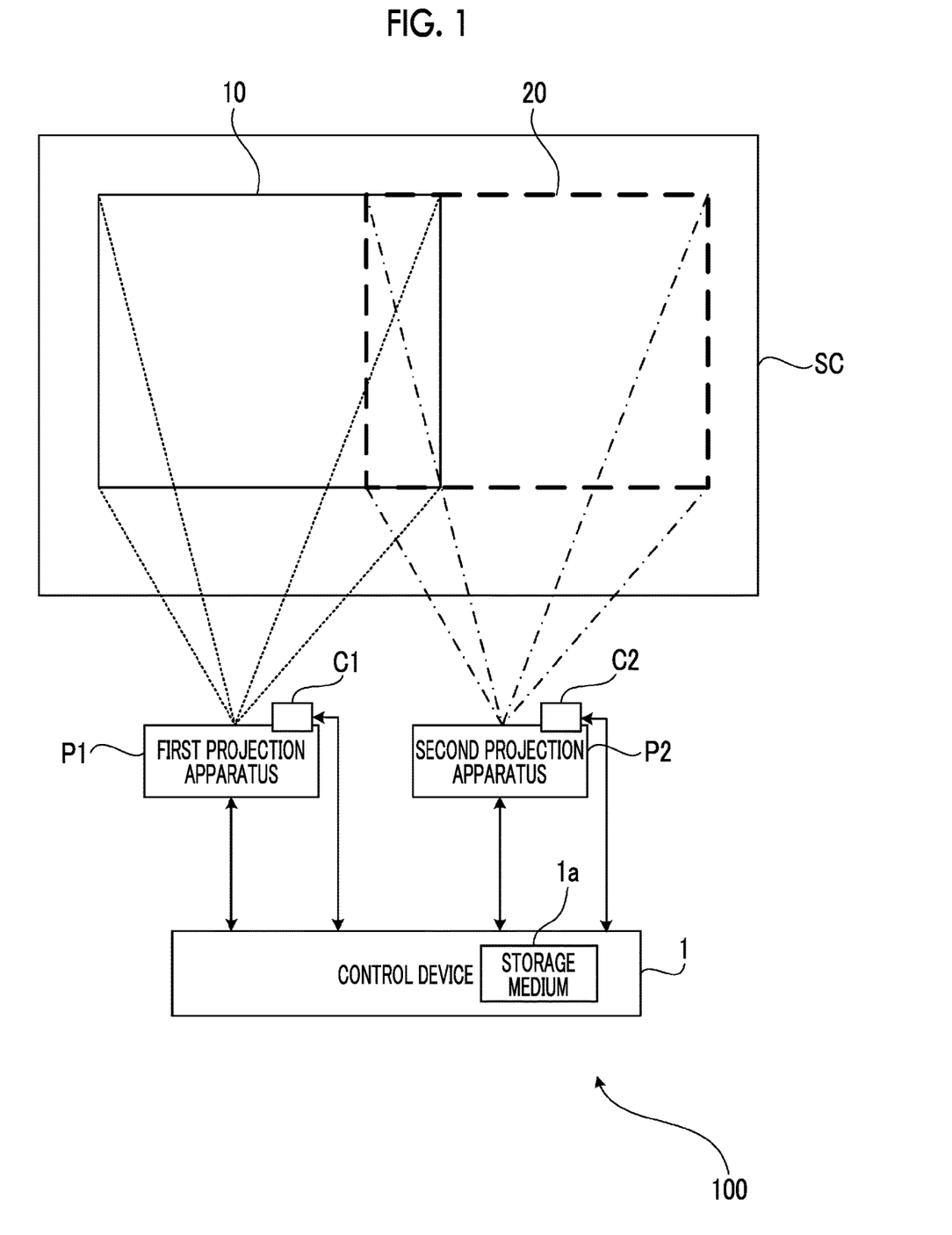
FIG. 1 is a schematic diagram illustrating a schematic configuration of a projection system 100 of an embodiment.

FIG. 1 is a schematic diagram illustrating a schematic configuration of a projection system 100 of the embodiment. The projection system 100 comprises a set of a first projection apparatus P1 constituting a projection unit and a first imaging unit C1 constituting an imaging unit, a set of a second projection apparatus P2 constituting a projection unit and a second imaging unit C2 constituting an imaging unit, a control device 1 that generally controls the entire system, and a screen SC. Each of the first projection apparatus P1 and the second projection apparatus P2 is configured with a projector using, for example, a liquid crystal panel, a liquid crystal on silicon (LCOS), or a digital micromirror device (DMD).

The projection system 100 displays a horizontally long projection target image by projecting a divided image to a first projection range 10 of the screen SC from the first projection apparatus P1, projecting a divided image to a second projection range 20 of the screen SC partially overlapping with the first projection range 10 from the second projection apparatus P2, and joining the two divided images together.

The control device 1 is a device including a control unit configured with various processors, a communication interface (not illustrated) for communicating with each unit, and a storage medium 1a such as a hard disk, a solid state drive (SSD), or a read only memory (ROM) and generally controls the first projection apparatus P1, the second projection apparatus P2, the first imaging unit C1, and the second imaging unit C2.

Examples of the various processors include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing. More specifically, a structure of these various processors is an electric circuit in which circuit elements such as semiconductor elements are combined. The control unit of the control device 1 may be configured with one of the various processors or may be configured with a combination of two or more processors of the same type or different types (for example, a combination of a plurality of FPGAs or a combination of a CPU and an FPGA). By executing a control program stored in the storage medium 1a, the control unit of the control device 1 functions as a control device comprising an operation detection unit and a control unit as function blocks.

The first imaging unit C1 comprises an imaging element such as a charged coupled device (CCD) image sensor or a metal oxide semiconductor (MOS) image sensor that images a subject through an imaging optical system, and images at least the first projection range 10 in the screen SC. A captured image CP1 of the first projection range 10 imaged by the first imaging unit C1 is transmitted to the control device 1.

The second imaging unit C2 comprises an imaging element such as a CCD image sensor or a MOS image sensor that images the subject through the imaging optical system, and images at least the second projection range 20 in the screen SC. A captured image CP2 of the second projection range 20 imaged by the second imaging unit C2 is transmitted to the control device 1.

In the projection system 100, the same imaging frame rate is set for each of the first imaging unit C1 and the second imaging unit C2, and a slight difference (difference less than or equal to a threshold value) is set to occur between an imaging timing of the first imaging unit C1 and an imaging timing of the second imaging unit C2. For example, the difference is a value less than an imaging interval in a case where the first imaging unit C1 performs continuous imaging.

Figure 2:
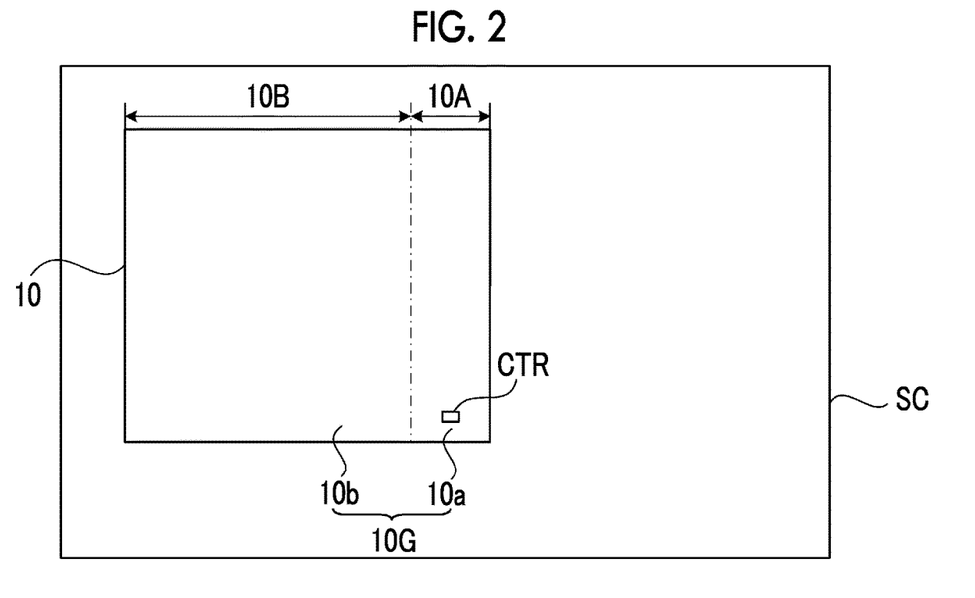
FIG. 2 is a diagram schematically illustrating an image projected to a first projection range 10 from a first projection apparatus P1 at a time of displaying a projection target image.

FIG. 2 is a diagram schematically illustrating the image projected to the first projection range 10 from the first projection apparatus P1 at a time of displaying the projection target image. At the time of displaying the projection target image, a first divided image 10G is projected to the first projection range 10 as illustrated in FIG. 3.

Figure 3:
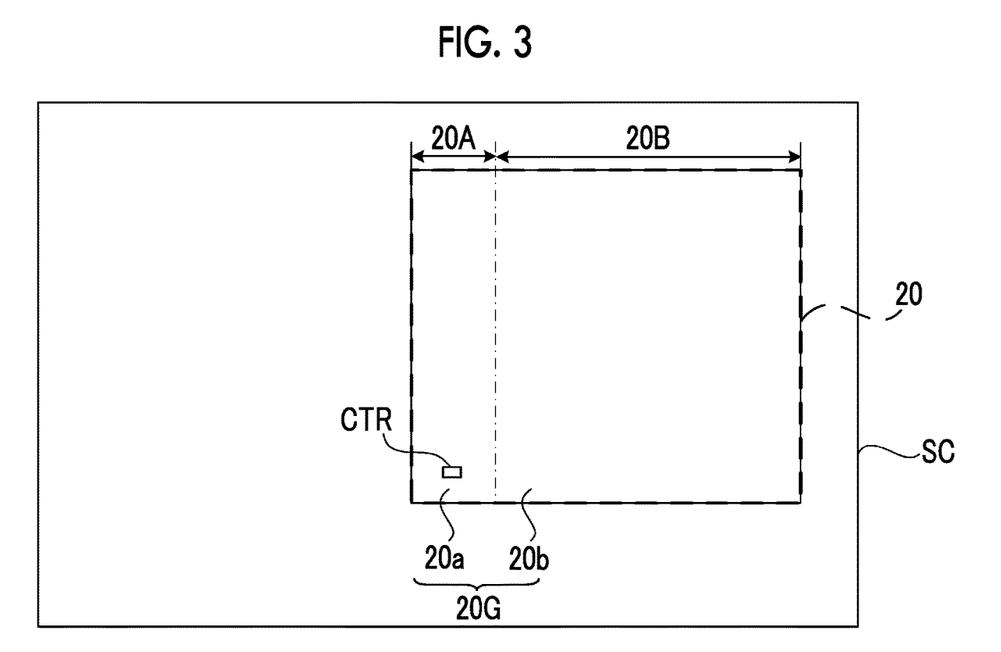
FIG. 3 is a diagram schematically illustrating an image projected to a second projection range 20 from a second projection apparatus P2 at the time of displaying the projection target image.

FIG. 3 is a diagram schematically illustrating the image projected to the second projection range 20 from the second projection apparatus P2 at the time of displaying the projection target image. At the time of displaying the projection target image, a second divided image 20G is projected to the second projection range 20 as illustrated in FIG. 4.

Figure 4:
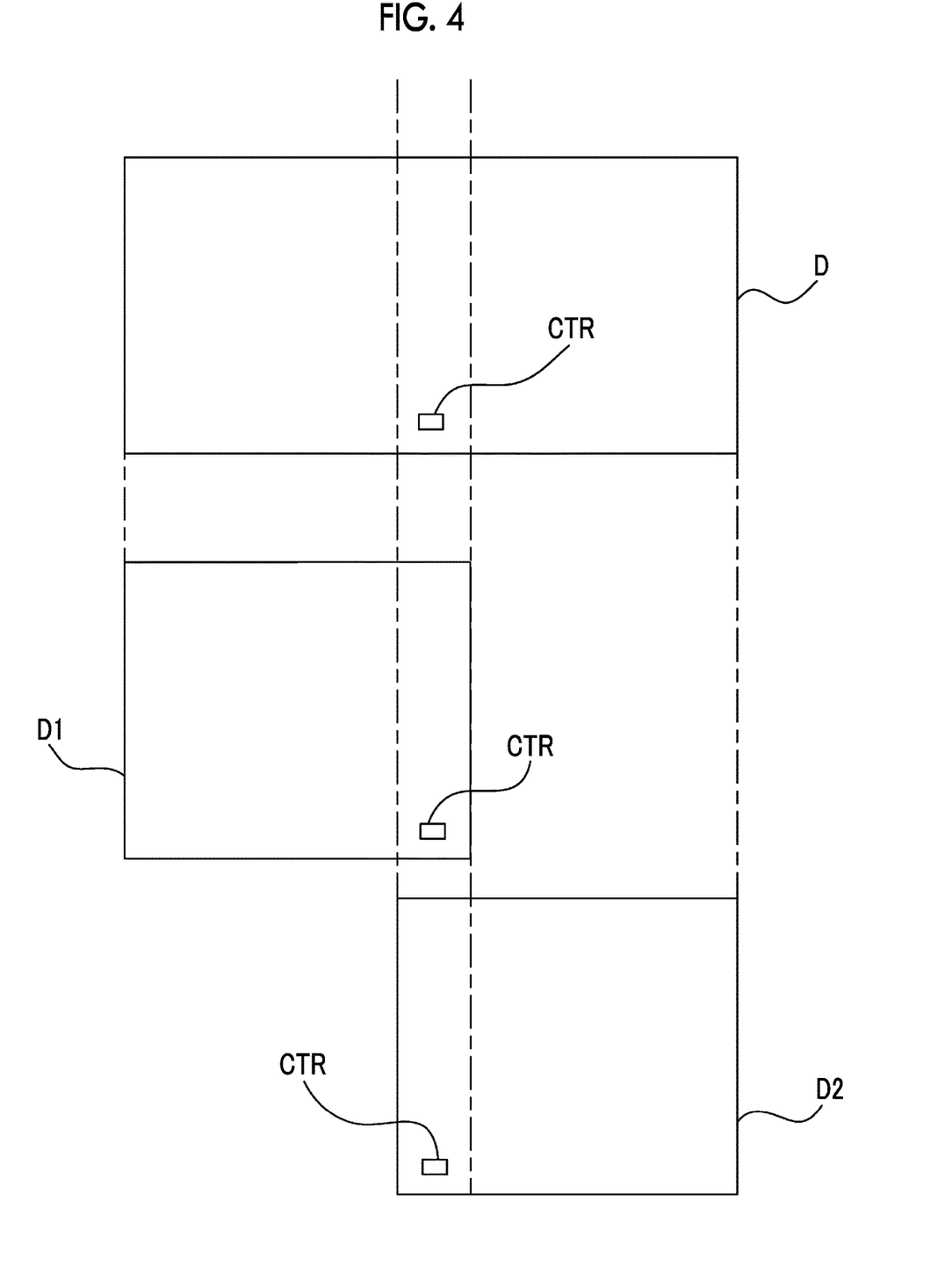
FIG. 4 is a schematic diagram for describing a generation process of display data for projecting divided images.

The control device 1 projects the projection target image configured with the first divided image 10G and the second divided image 20G partially overlapping with each other to the screen SC by generating first display data D1 for projecting the first divided image 10G and second display data D2 for projecting the second divided image 20G from one display data D illustrated in FIG. 4 and inputting the first display data D1 into the first projection apparatus P1 and inputting the second display data D2 into the second projection apparatus P2.

The first divided image 10G illustrated in FIG. 2 is configured with a first non-superimposed region 10b and a first superimposed region 10a. The first superimposed region 10a is a region projected to an overlapping part 10A of the first projection range 10 with the second projection range 20. The first non-superimposed region 10b is a region projected to a non-overlapping part 10B of the first projection range 10 with the second projection range 20.

The second divided image 20G illustrated in FIG. 3 is configured with a second superimposed region 20a and a second non-superimposed region 20b. The second superimposed region 20a is a region projected to an overlapping part 20A of the second projection range 20 with the first projection range 10. The second non-superimposed region 20b is a region projected to a non-overlapping part 20B of the second projection range 20 with the first projection range 10.

The first superimposed region 10a illustrated in FIG. 2 and the second superimposed region 20a illustrated in FIG. 3 are the same image. In the examples of FIG. 2 to FIG. 4, an operating part CTR is included in each of the first superimposed region 10a and the second superimposed region 20a. The operating part CTR is an icon such as a button for receiving an instruction from a user. The operating part CTR may not be included in each of the first superimposed region 10a and the second superimposed region 20*a* or may be included in the first non-superimposed region 10*b* or the second non-superimposed region 20*b*.

In a state where the projection target image consisting of the first divided image 10G and the second divided image 20G is displayed, in a case where instructing the operating part CTR in the projection target image with a finger, a pointer, or the like is detected, the control device 1 determines that an operation (hereinafter, referred to as an execution operation) of providing an instruction to execute a predetermined control is performed, and executes the predetermined control.

Examples of the predetermined control include, but not limited to, a control of changing the projection target image being displayed to another projection target image, a control of changing brightness, contrast, or the like of the projection target image being displayed, or a control of playing back or stopping a motion picture content included in the projection target image being displayed.

Figure 5:
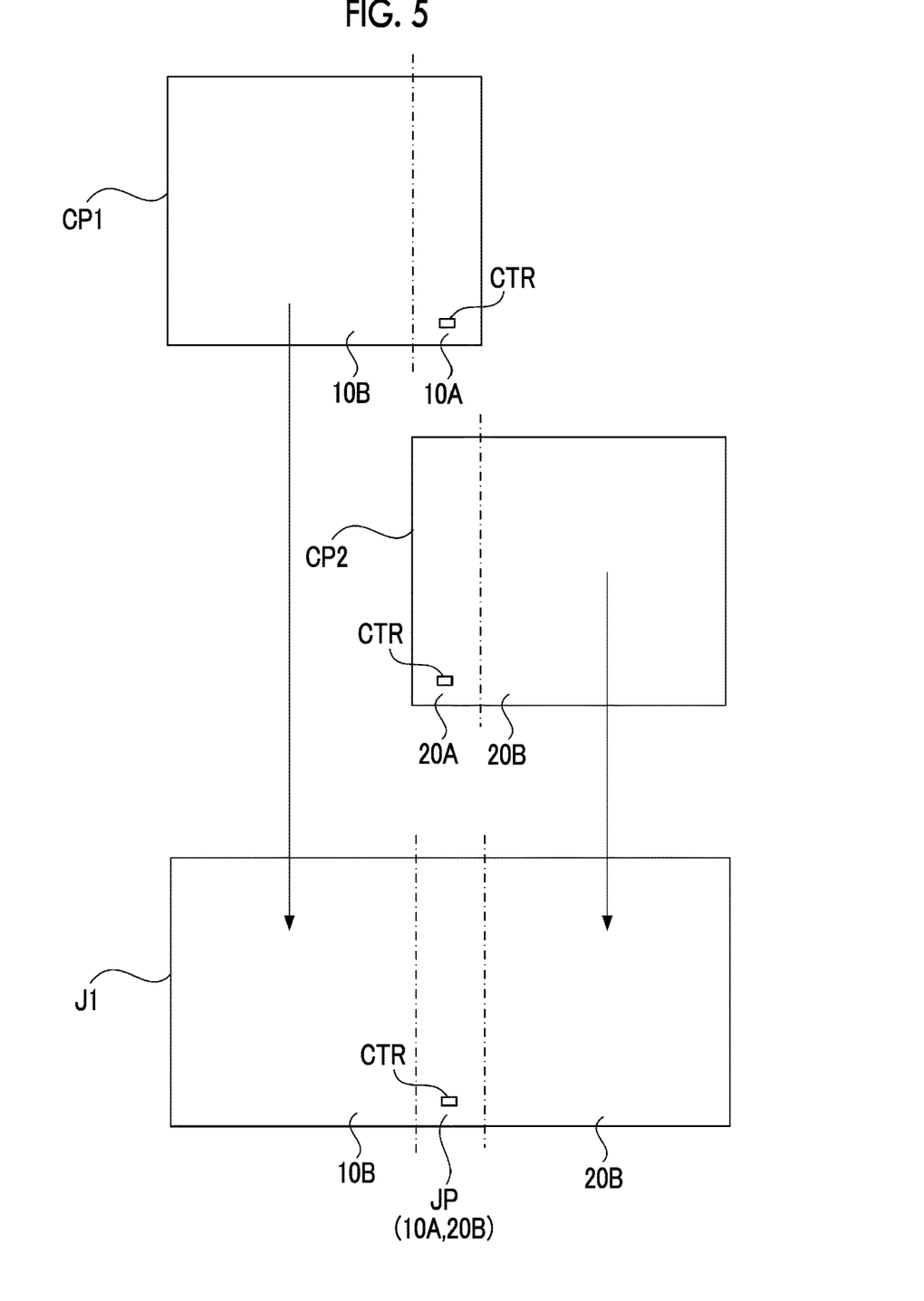
FIG. 5 is a schematic diagram for describing detection processing of an execution operation by a control device 1.

FIG. 5 is a schematic diagram for describing detection processing of the execution operation by the control device 1. In a state where the projection target image is displayed, the control device 1 generates a joined image J1 by joining the captured image CP1 of the first projection range 10 acquired from the first imaging unit C1 and the captured image CP2 of the second projection range 20 acquired from the second imaging unit C2 and detects the execution operation based on the joined image J1.

The captured image CP1 and the captured image CP2 used in the generation of the joined image J1 have a difference in imaging timing of less than or equal to the threshold value (in other words, two captured images continuously captured by the first imaging unit C1 and the second imaging unit C2 at the closest timings).

The control device 1, for example, generates the joined image J1 by superimposing an image of the overlapping part 10A in the captured image CP1 with an image of the overlapping part 20A in the captured image CP2. By this processing, as illustrated in FIG. 5, the joined image J1 consisting of an image of the non-overlapping part 10B in the captured image CP1, an image JP configured by adding or averaging each pixel value of the overlapping part 10A in the captured image CP1 and each pixel value of the image of the overlapping part 20A in the captured image CP2, and an image of the non-overlapping part 20B in the captured image CP2 is generated.

In a case where an instruction image corresponding to an object such as a hand of a person overlaps with the operating part CTR included in the joined image J1 generated in such a manner, the control device 1 determines that the execution operation is performed. In a case where the instruction image does not overlap with the operating part CTR included in the joined image J1, the control device 1 determines that the execution operation is not performed.

Figure 6:
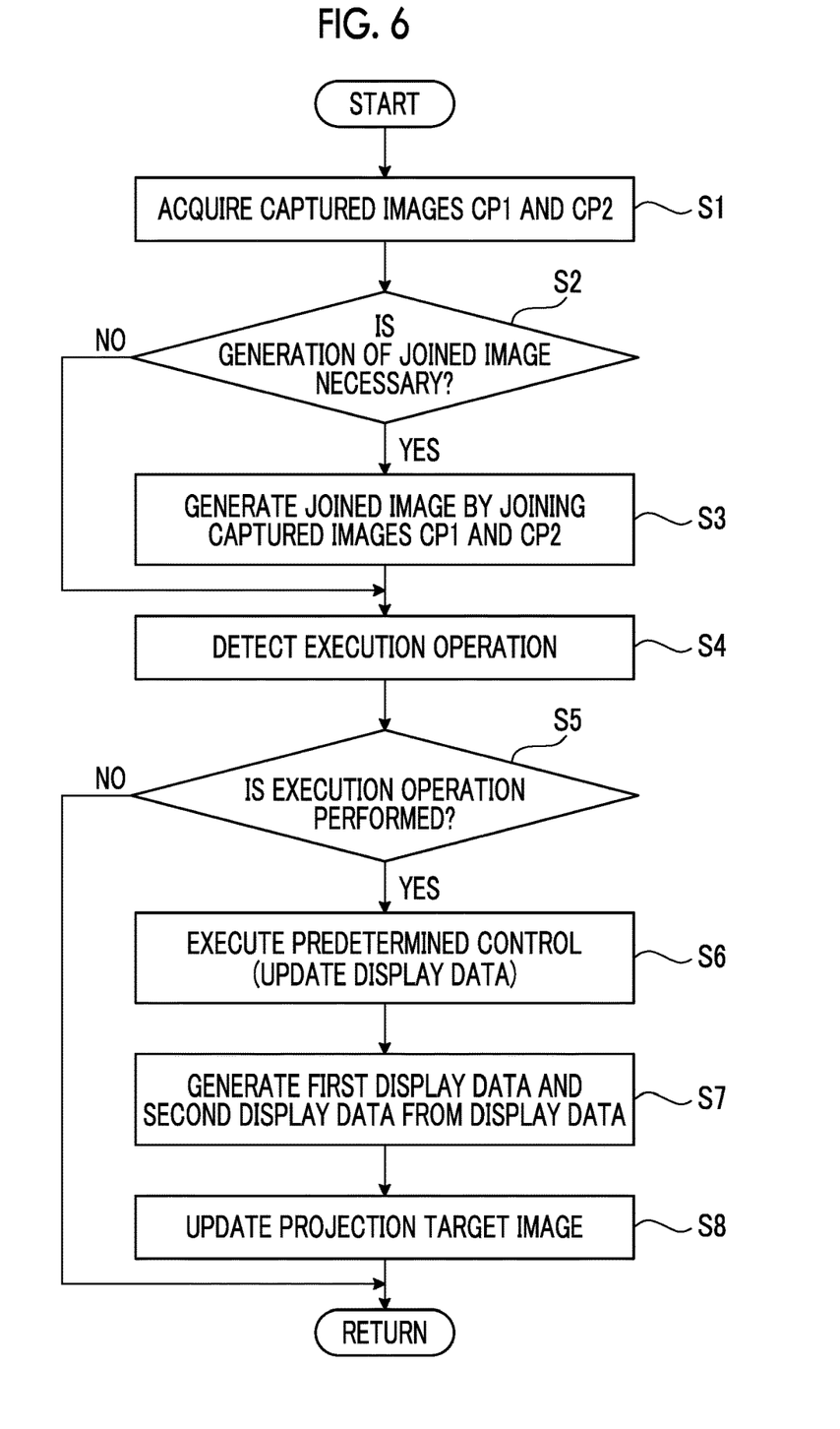
FIG. 6 is a flowchart for describing an example of operation of the control device 1.

FIG. 6 is a flowchart for describing an example of operation of the control device 1. In a case where the projection target image based on the display data D illustrated in FIG. 4 is projected to the screen SC, processing illustrated in FIG. 6 is started. The processing illustrated in FIG. 6 is performed by executing the control program stored in the storage medium 1*a* of the control device 1 by the control unit of the control device 1.

First, the control device 1 acquires the captured image CP1 from the first imaging unit C1 and acquires the captured image CP2 from the second imaging unit C2 (step S1).

Next, the control device 1 determines whether or not it is necessary to generate the joined image of the captured image CP1 and the captured image CP2 acquired in step S1 (step S2). Examples of a method of determining the necessity of generating the joined image include the following two methods.

(First Necessity Determination Method)

The control device 1 determines that the generation of the joined image is not necessary in a case where the operating part CTR is not included in each of the image of the overlapping part 10A in the captured image CP1 and the image of the overlapping part 20A in the captured image CP2, and determines that the generation of the joined image is necessary in a case where the operating part CTR is included in each of the image of the overlapping part 10A and the image of the overlapping part 20A.

(Second Necessity Determination Method)

The control device 1 determines that the generation of the joined image is not necessary in a case where the instruction image is not included in each of the image of the overlapping part 10A in the captured image CP1 and the image of the overlapping part 20A in the captured image CP2, and determines that the generation of the joined image is necessary in a case where the instruction image is included in each of the image of the overlapping part 10A and the image of the overlapping part 20A.

In a case where it is determined that the generation of the joined image is necessary (step S2: YES), the control device 1 generates the joined image obtained by joining the captured image CP1 and the captured image CP2 acquired in step S1 (step S3) and advances the processing to step S4.

In a case where it is determined that the generation of the joined image is not necessary (step S2: NO), the control device 1 advances the processing to step S4 without joining the captured image CP1 and the captured image CP2 acquired in step S1.

In step S4, the control device 1 performs the detection processing of the execution operation. In a case where the processing in step S3 is performed, the control device 1 detects the execution operation by determining whether or not the operating part CTR overlapping with the instruction image is included in the joined image. Specifically, the control device 1 determines that the execution operation is performed in a case where the operating part CTR overlapping with the instruction image is included in the joined image, and determines that the execution operation is not performed in a case where the operating part CTR overlapping with the instruction image is not included in the joined image.

In addition, in step S4, in a case where the processing in step S3 is not performed, the control device 1 detects the execution operation by determining whether or not the operating part CTR overlapping with the instruction image is included in any of the image of the non-overlapping part 10B in the captured image CP1 acquired in step S1 and the image of the non-overlapping part 20B in the captured image CP2 acquired in step S1. Specifically, the control device 1 determines that the execution operation is performed in a case where the operating part CTR overlapping with the instruction image is included in any of the images, and determines that the execution operation is not performed in a case where the operating part CTR overlapping with the instruction image is not included in any of the images.

In a case where it is determined that the execution operation is performed as a result of the processing in step S4 (step S5: YES), the control device 1 executes the predetermined control (step S6).

Specifically, the control device 1 updates the display data by performing processing (for example, changing the brightness, changing the contrast, or playing back the motion picture) of reflecting an effect based on the predetermined control for which the instruction to execute is provided, on the display data that is a base of the projection target image. The control device 1 newly generates first display data for the first projection apparatus P1 and second display data for the second projection apparatus P2 from the display data after the update (step S7) and updates the divided images (projection target image) being projected by inputting the first display data and the second display data into each projection apparatus (step S8).

In a case where it is determined that the execution operation is not performed as a result of the processing in step S4 (step S5: NO), the control device 1 returns the processing to step S1 after step S8.

As described above, the control device 1 determines whether or not the user operates the operating part CTR projected to the overlapping part 10A (20A) between the first projection range 10 and the second projection range 20 based on the captured image CP1 acquired from the first imaging unit C1 and the captured image CP2 acquired from the second imaging unit C2. Since the operating part CTR is projected to the overlapping part 10A (20A), the operating part CTR is also included in both of the captured image CP1 and the captured image CP2. Thus, for example, it is also possible to determine whether or not the user operates the operating part CTR projected to the overlapping part 10A (20A) by monitoring only the image of the overlapping part 10A in the captured image CP1.

However, in order to perform this determination with high accuracy, it is required to acquire the captured image CP1 with high frequency. That is, it is required to increase the imaging frame rate of the first imaging unit C1. In the present embodiment, a difference is provided between the imaging timings of the captured image CP1 and the captured image CP2, and this difference is shorter than the imaging interval of each of the first imaging unit C1 and the second imaging unit C2.

Thus, for example, in a case where this difference in imaging timing is set to half of the imaging interval of the first imaging unit C1, the captured image CP1 and the captured image CP2 can be acquired at an interval of 60 frames per second (fps) even in a case where the imaging frame rate of each of the first imaging unit C1 and the second imaging unit C2 is set to, for example, 30 fps. Accordingly, it is possible to decrease a cost of the imaging unit in the projection system 100 or reduce a processing load while imaging the overlapping part 10A (20A) with high frequency. Accordingly, the detection of the operation of the operating part CTR projected to the overlapping part 10A (20A) can be performed with high accuracy at a low cost and a low load.

In addition, the control device 1 determines whether or not the instruction for the operating part CTR is provided based on the joined image (image JP in FIG. 5) of the image of the overlapping part 10A in the captured image CP1 and the image of the overlapping part 20A in the captured image CP2. According to this configuration, for example, duplicate detection of the operation of the operating part CTR can be prevented compared to a case where whether or not the operating part CTR is operated is individually determined based on each image.

In addition, the control device 1 determines the necessity of generating the joined image in step S2 in FIG. 6 and generates the joined image only in a case where it is determined that the generation is necessary. According to this configuration, since it is not necessary to generate the joined image at all times, a processing load of the control device 1 can be reduced. It is also possible to configure the joined image to be generated at all times by omitting the processing in step S2 in FIG. 6.

Hereinafter, modification examples of the projection system 100 will be described.

First Modification Example

The control device 1 may generate the joined image J1 by trimming the image of the overlapping part 10A from the captured image CP1, trimming the image of the overlapping part 20A from the captured image CP2, and superimposing each trimmed image. In this method, only the image JP configured by adding or averaging each pixel value of the image of the overlapping part 10A in the captured image CP1 and each pixel value of the image of the overlapping part 20A in the captured image CP2 is generated as the joined image J1. This method can be employed on an assumption that the operating part CTR is projected to only the overlapping part 10A (20A). According to this method, the processing load of the control device 1 can be reduced.

Second Modification Example

In the operation in FIG. 6, while the processing in step S2 to step S5 (that is, processing of detecting the execution operation) is being performed, the control device 1 may perform the processing in step S1 (that is, processing of acquiring new captured images CP1 and CP2) in parallel. According to this configuration, the detection processing of the execution operation can be performed at a high speed.

Third Modification Example

In the projection system 100, the control device 1 may be configured to be incorporated in any of the first projection apparatus P1 and the second projection apparatus P2. In addition, in the projection system 100, in each set of the projection unit and the imaging unit, the imaging unit may be configured to be incorporated in the projection unit. According to these configurations, wiring lines connecting each unit can be simplified, and a system construction cost can be decreased. For example, the first projection apparatus P1, the first imaging unit C1, and the control device 1 may be configured in the same apparatus as a main projection apparatus, and this main projection apparatus may be configured to control the other set.

Fourth Modification Example

In the projection system 100, one or more sets of the projection unit and the imaging unit may be further provided.

Figure 7:
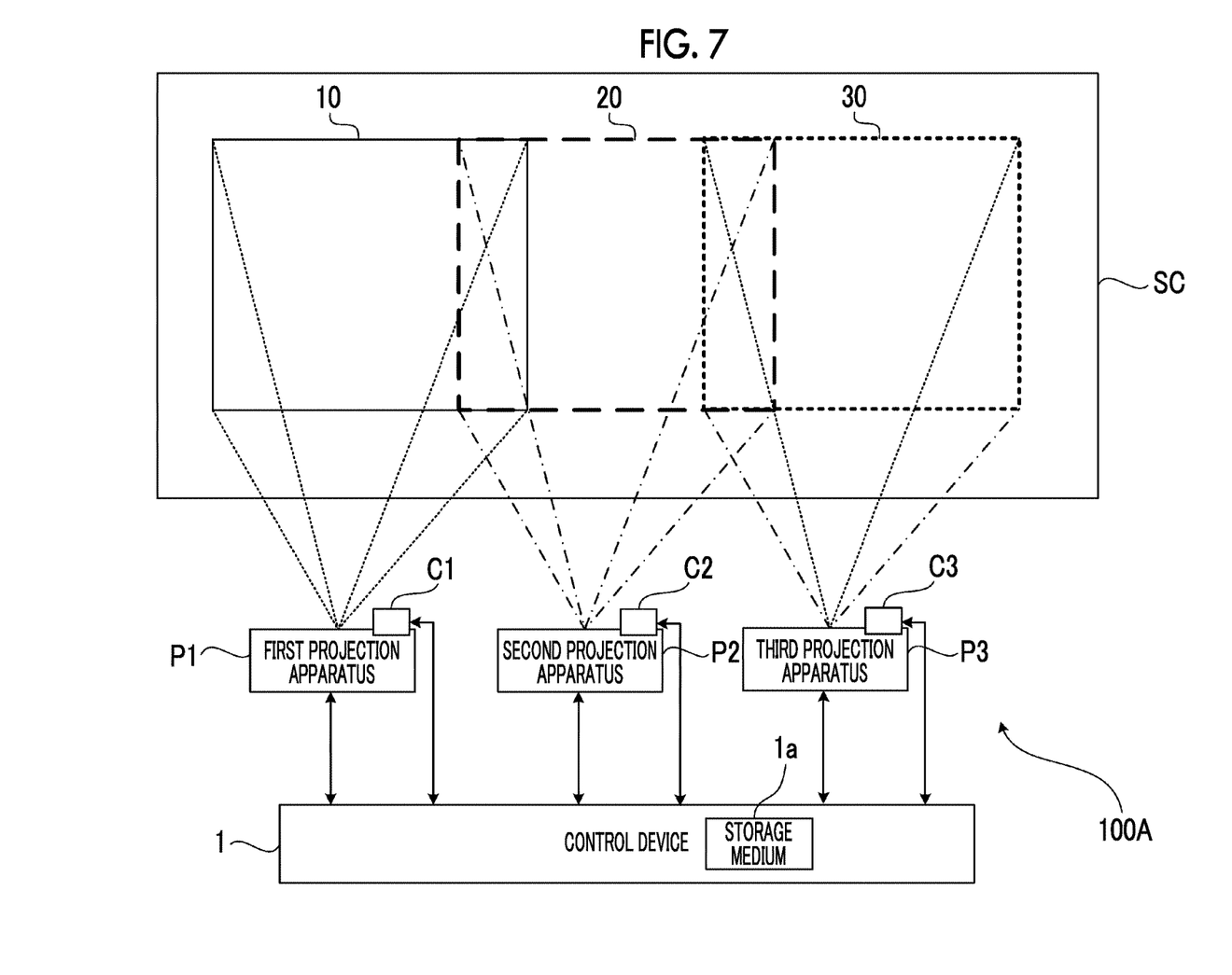
FIG. 7 is a schematic diagram illustrating a schematic configuration of a projection system 100A that is a modification example of the projection system 100.

FIG. 7 is a schematic diagram illustrating a schematic configuration of a projection system 100A that is a modification example of the projection system 100. The projection system 100A has the same configuration as the projection system 100 except that a set of a third projection apparatus P3 as the projection unit and a third imaging unit C3 as the imaging unit is added.

A third projection range 30 of the third projection apparatus P3 partially overlaps with the second projection range 20. The third imaging unit C3 images at least the third projection range 30 and transmits a captured image CP3 to the control device 1.

The same imaging frame rate is set for each of first imaging unit C1, the second imaging unit C2, and the third imaging unit C3, and imaging is performed in an order of the first imaging unit C1, the second imaging unit C2, and the third imaging unit C3. In addition, a slight difference (difference less than or equal to the threshold value) is set to occur between the imaging timing of the second imaging unit C2 and an imaging timing of the third imaging unit C3. This difference is the same as the difference between the imaging timing of the first imaging unit C1 and the imaging timing of the second imaging unit C2.

In the projection system 100A, for example, a state where a first operating part CTR1 is projected to an overlapping part between the first projection range 10 and the second projection range 20, and a second operating part CTR2 is projected to an overlapping part between the second projection range 20 and the third projection range 30 is assumed.

In this state, the control device 1 acquires the captured image CP1 of the first projection range 10 and the captured image CP2 of the second projection range 20 and detects an operation for the first operating part CTR1 by determining whether or not the instruction image overlaps with the first operating part CTR1 based on a joined image obtained by joining the captured image CP1 and the captured image CP2.

In addition, the control device 1 acquires the captured image CP2 of the second projection range 20 and the captured image CP3 of the third projection range 30 and detects an operation for the second operating part CTR2 by determining whether or not the instruction image overlaps with the second operating part CTR2 based on a joined image obtained by joining the captured image CP2 and the captured image CP3. In a case where it is determined that the operation for the first operating part CTR1 or the operation for the second operating part CTR2 is performed, the control device 1 executes the predetermined control.

In such a manner, even in a case of performing larger screen display using three or more sets, an operation for an operating part projected to an overlapping part between projection ranges can be detected with high accuracy at a low cost and a low load.

In the projection system 100A, for example, a state where the operating part CTR is projected to only the overlapping part between the first projection range 10 and the second projection range 20, and the operating part CTR is not projected to the overlapping part between the second projection range 20 and the third projection range 30 may also occur. An example of captured images acquired in this state from the first imaging unit C1, the second imaging unit C2, and the third imaging unit C3 in this order is illustrated in FIG. 8.

Figure 8:
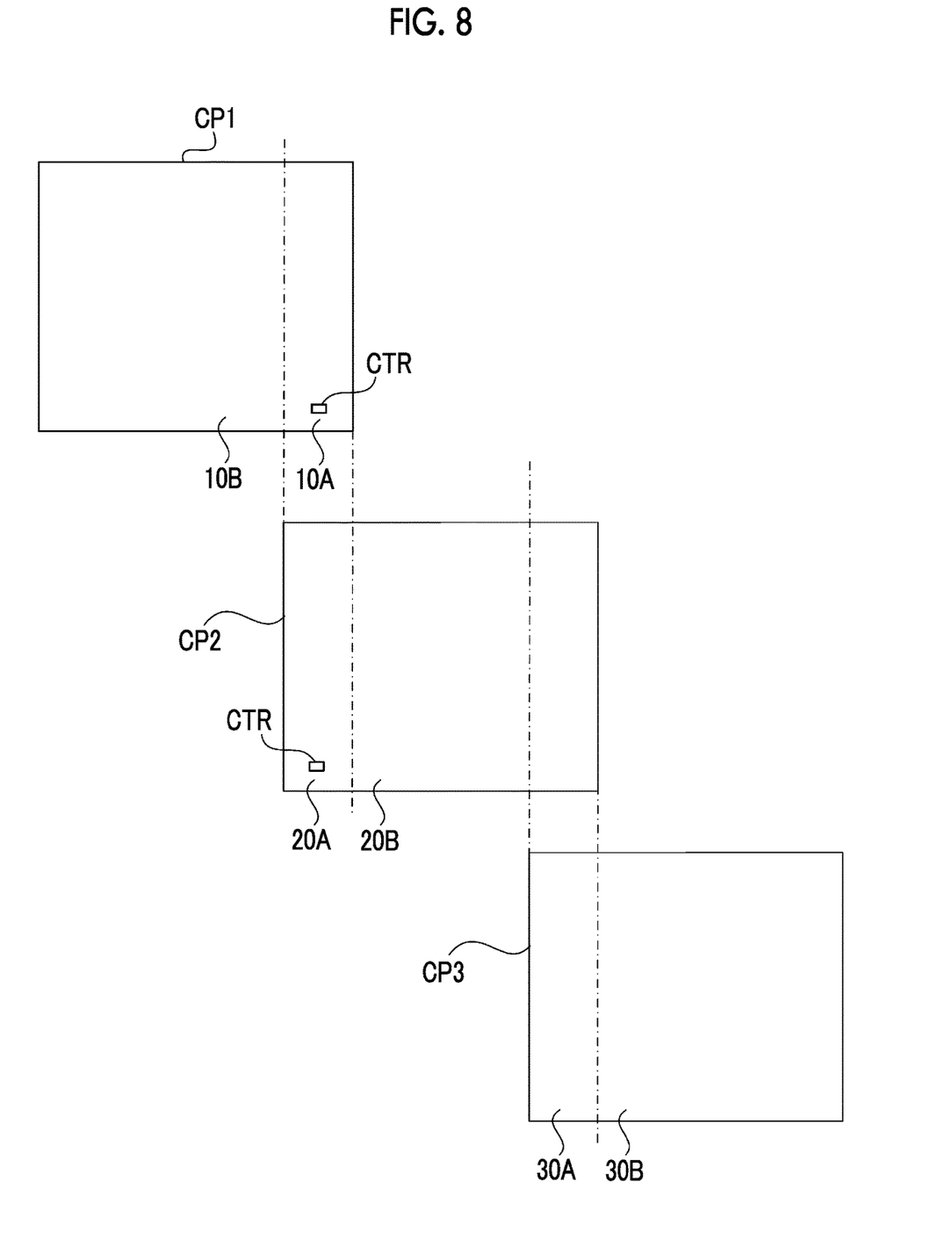
FIG. 8 is a schematic diagram illustrating an example of a captured image acquired from each imaging unit of the projection system 100A of FIG. 7.

FIG. 8 illustrates the captured image CP1, the captured image CP2, and the captured image CP3. The captured image CP3 is configured with an image of an overlapping part 30A between the second projection range 20 and the third projection range 30 and an image of a non-overlapping part 30B not overlapping with the second projection range 20 in the third projection range 30. In the example in FIG. 8, the operating part CTR is included in each of the image of the overlapping part 10A in the captured image CP1 and the image of the overlapping part 20A in the captured image CP2.

In the example illustrated in FIG. 8, the operating part CTR is not included in each of an image of the overlapping part 30A in the captured image CP2 and the image of the overlapping part 30A in the captured image CP3. Thus, it is not essential to join the captured image CP2 and the captured image CP3. Meanwhile, the operating part CTR is included in each of the image of the overlapping part 10A in the captured image CP1 and the image of the overlapping part 20A in the captured image CP2. Thus, it is necessary to join the captured image CP1 and the captured image CP2.

Accordingly, in a case where the captured image is acquired from the imaging unit of each of the three or more sets, the control device 1 determines that the generation of the joined image is necessary in a case where the operating part CTR is included in the image of the overlapping part in any one of the three or more captured images, and determines that the generation of the joined image is not necessary in a case where the operating part CTR is not included in the image of the overlapping part in each of the three or more captured images.

Alternatively, in a case where the captured image is acquired from the imaging unit of each of the three or more sets, the control device 1 may determine that the generation of the joined image is necessary in a case where the instruction image is included in the image of the overlapping part in any one of the three or more captured images, and determine that the generation of the joined image is not necessary in a case where the instruction image is not included in the image of the overlapping part in each of the three or more captured images.

In the example in FIG. 8, while it is determined that the generation of the joined image is necessary, the generation of the joined image may employ a method of performing only joining processing of the captured image CP1 and the captured image CP2 and omitting joining of the captured image CP3 with the other images, in addition to a method of joining the captured image CP1, the captured image CP2, and the captured image CP3 by superimposing the overlapping parts on each other.

In addition, as in the projection system 100A, in a case where the number of sets of the projection unit and the imaging unit is increased, time and an operation amount taken for determination processing of the necessity of generating the joined image are increased. Therefore, in a case where the total number of sets of the entire system exceeds a threshold value, the control device 1 of the projection system 100A may omit the determination processing and unconditionally generate the joined image without performing the determination processing. By doing so, the processing load of the control device 1 can be reduced.

Fifth Modification Example

Figure 9:
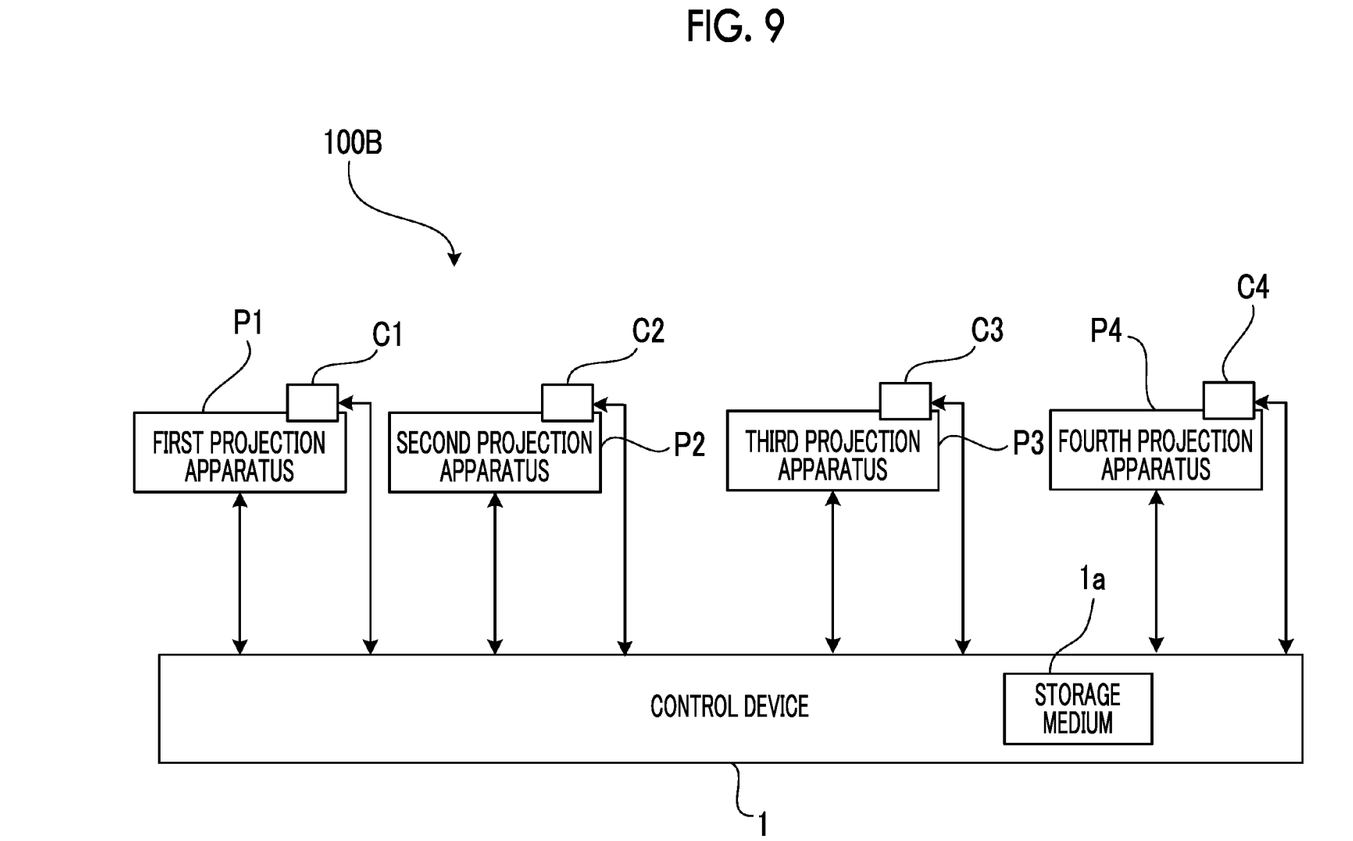
FIG. 9 is a schematic diagram illustrating a schematic configuration of a projection system 100B that is a modification example of the projection system 100.

FIG. 9 is a schematic diagram illustrating a schematic configuration of a projection system 100B that is a modification example of the projection system 100. The projection system 100B has the same configuration as the projection system 100 except that the set of the third projection apparatus P3 as the projection unit and the third imaging unit C3 as the imaging unit and a set of a fourth projection apparatus P4 as the projection unit and a fourth imaging unit C4 as the imaging unit are added.

The same imaging frame rate is set for each of first imaging unit C1, the second imaging unit C2, the third imaging unit C3, and the fourth imaging unit C4, and imaging is performed in an order of the first imaging unit C1, the second imaging unit C2, the third imaging unit C3, and the fourth imaging unit C4. In addition, a slight difference (difference less than or equal to the threshold value) is set to occur between the imaging timing of the second imaging unit C2 and the imaging timing of the third imaging unit C3. A slight difference (difference less than or equal to the threshold value) is set to occur between the imaging timing of the third imaging unit C3 and an imaging timing of the fourth imaging unit C4.

Figure 10:
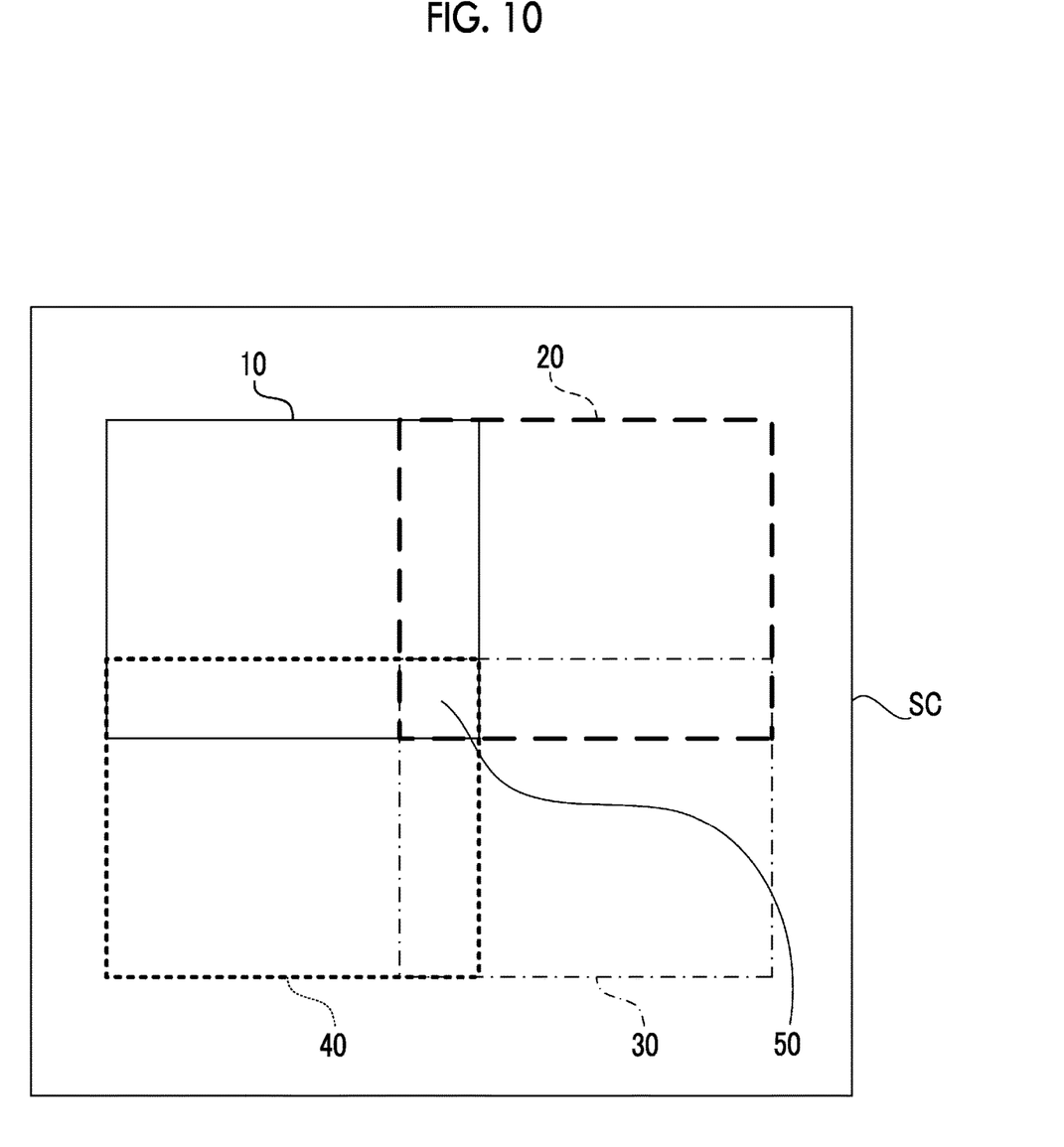
FIG. 10 is a schematic diagram illustrating a projection range of each projection unit of the projection system 100B illustrated in FIG. 9.

FIG. 10 is a schematic diagram illustrating a projection range of each projection unit of the projection system 100B illustrated in FIG. 9. As illustrated in FIG. 10, a right end of the first projection range 10 overlaps with a left end of the second projection range 20. In addition, a lower end of the second projection range 20 overlaps with an upper end of the third projection range 30 of the third projection apparatus P3. In addition, a left end of the third projection range 30 overlaps with a right end of a fourth projection range 40 of the fourth projection apparatus P4. In addition, an upper end of the fourth projection range 40 overlaps with a lower end of the first projection range 10. In such a manner, in the projection system 100B, the first projection range 10, the second projection range 20, the third projection range 30, and the fourth projection range 40 are configured to have common regions 50 that overlap with each other.

In the projection system 100B, for example, a state where the operating part CTR is projected to the common regions 50 is assumed. In this state, the control device 1 sequentially acquires the captured image CP1 of the first projection range 10, the captured image CP2 of the second projection range 20, the captured image CP3 of the third projection range 30, and a captured image CP4 of the fourth projection range 40. The control device 1 detects an operation for the operating part CTR by generating a joined image obtained by joining images of at least the common regions 50 in the captured images CP1 to CP4 and determining whether or not the instruction image overlaps with the operating part CTR based on the joined image.

In such a manner, even in a case of performing large screen display by two-dimensionally arranging projection ranges horizontally and vertically, an operation for an operating part projected to an overlapping part between projection ranges can be detected with high accuracy at a low cost and a low load.

Sixth Modification Example

The first imaging unit C1 and the second imaging unit C2 of the projection system 100 may be commonized as one imaging unit (referred to as a common imaging unit). In this case, the common imaging unit is configured to be capable of imaging at least each of the first projection range 10 and the second projection range 20. For example, the common imaging unit has an angle of view with which only a range almost equivalent to each of the first projection range 10 and the second projection range 20 can be imaged, and furthermore, includes a mechanism (a swing mechanism that moves the entire apparatus, a mechanism that changes an optical path by a mirror included in an optical system, or the like) that can move an imaging range.

Specifically, the common imaging unit is configured to be capable of sequentially acquiring a captured image cp1 corresponding to the captured image CP1 and a captured image cp2 corresponding to the captured image CP2 by repeating an operation of imaging the first projection range 10, then imaging the second projection range 20 by moving the imaging range, and then imaging the first projection range 10 by returning the imaging range to an original position. Functions of the control device 1 are the same as described above except that the captured images used in detection of the execution operation are changed from the captured image CP1 to the captured image cp1 and changed from the captured image CP2 to the captured image cp2.

As described above, at least the following matters are disclosed in the present specification.

(1) A control device of a projection system including a plurality of projection units and an imaging unit that images at least a projection range of each of the plurality of projection units, the projection range of each of the plurality of projection units including an overlapping part partially overlapping with the projection range of the other projection unit, the control device comprising an operation detection unit that detects an operation of providing an instruction to execute a predetermined control based on an image of at least the overlapping part in a captured image of each of a plurality of the projection ranges which are imaged by the imaging unit and have the overlapping part in common, and a control unit that executes the predetermined control in a case where the operation detection unit determines that the operation is performed.

(2) The control device according to (1), in which the projection system includes a plurality of sets of the projection unit and the imaging unit that images at least the projection range of the projection unit.

(3) The control device according to (2), in which the operation detection unit detects the operation based on the image of at least the overlapping part in the captured image of each imaging unit of a combination of the plurality of sets having the overlapping part in common.

(4) The control device according to (3), in which the captured image of each imaging unit of the combination is obtained by imaging at different timings.

(5) The control device according to (4), in which a difference between the timings is less than or equal to a threshold value for the captured image of each imaging unit of the combination.

(6) The control device according to any one of (3) to (5), in which the combination includes all of the sets.

(7) The control device according to any one of (3) to (6), in which the operation detection unit generates a joined image obtained by joining the images of at least the overlapping part in the captured image of each imaging unit of the combination and detects the operation based on the joined image.

(8) The control device according to (7), in which the operation detection unit generates the joined image by adding the image of at least the overlapping part in the captured image of each imaging unit of the combination.

(9) The control device according to (7) or (8), in which the operation detection unit determines necessity of generating the joined image and generates the joined image in a case where it is determined that the generation is necessary.

(10) The control device according to (9), in which the operation detection unit determines that the generation of the joined image is necessary in a case where a specific image is included in the overlapping part in the captured image of each imaging unit of the combination.

(11) The control device according to (9), in which the operation detection unit determines that the generation of the joined image is necessary in a case where a specific image is included in the overlapping part in the captured image of the imaging unit of any one of all of the sets.

(12) The control device according to (10) or (11), in which the specific image is an icon included in an image projected from the projection unit.

(13) The control device according to (10) or (11), in which the specific image is an object present between the projection unit and the projection range.

(14) The control device according to any one of (9) to (13), in which in a case where the total number of the sets exceeds a threshold value, the operation detection unit omits determination processing of the necessity of generating the joined image and generates the joined image without performing the determination processing.

(15) The control device according to any one of (3) to (14), in which the operation detection unit performs acquisition of the captured images from the imaging units of the combination and the detection of the operation in parallel.

(16) A projection apparatus comprising the control device according to any one of (1) to (15), the projection unit, and the imaging unit.

(17) A control method of a projection system including a plurality of projection units and an imaging unit that images at least a projection range of each of the plurality of projection units, the projection range of each of the plurality of projection units including an overlapping part partially overlapping with the projection range of the other projection unit, the control method comprising an operation detection step of detecting an operation of providing an instruction to execute a predetermined control based on an image of at least the overlapping part in a captured image of each of a plurality of the projection ranges which are imaged by the imaging unit and have the overlapping part in common, and a control step of executing the predetermined control in a case where it is determined that the operation is performed in the operation detection step.

(18) The control method according to (17), in which the projection system includes a plurality of sets of the projection unit and the imaging unit that images at least the projection range of the projection unit.

(19) The control method according to (18), in which in the operation detection step, the operation is detected based on the image of at least the overlapping part in the captured image of each imaging unit of a combination of the plurality of sets having the overlapping part in common.

(20) The control method according to (19), in which the captured image of each imaging unit of the combination is obtained by imaging at different timings.

(21) The control method according to (20), in which a difference between the timings is less than or equal to a threshold value for the captured image of each imaging unit of the combination.

(22) The control method according to any one of (19) to (21), in which the combination includes all of the sets.

(23) The control method according to any one of (19) to (22), in which in the operation detection step, a joined image obtained by joining the images of at least the overlapping part in the captured image of each imaging unit of the combination is generated, and the operation is detected based on the joined image.

(24) The control method according to (23), in which in the operation detection step, the joined image is generated by adding the image of at least the overlapping part in the captured image of each imaging unit of the combination.

(25) The control method according to (23) or (24), in which in the operation detection step, necessity of generating the joined image is determined, and the joined image is generated in a case where it is determined that the generation is necessary.

(26) The control method according to (25), in which in the operation detection step, it is determined that the generation of the joined image is necessary in a case where a specific image is included in the overlapping part in the captured image of each imaging unit of the combination.

(27) The control method according to (25), in which in the operation detection step, it is determined that the generation of the joined image is necessary in a case where a specific image is included in the overlapping part in the captured image of the imaging unit of any one of all of the sets.

(28) The control method according to (26) or (27), in which the specific image is an icon included in an image projected from the projection unit.

(29) The control method according to (26) or (27), in which the specific image is an object present between the projection unit and the projection range.

(30) The control method according to any one of (25) to (29), in which in the operation detection step, in a case where the total number of the sets exceeds a threshold value, determination processing of the necessity of generating the joined image is omitted, and the joined image is generated without performing the determination processing.

(31) The control method according to any one of (19) to (30), in which in the operation detection step, acquisition of the captured images from the imaging units of the combination and the detection of the operation are performed in parallel.

(32) A control program of a projection system including a plurality of projection units and an imaging unit that images at least a projection range of each of the plurality of projection units, the projection range of each of the plurality of projection units including an overlapping part partially overlapping with the projection range of the other projection unit, the control program causing a computer to execute an operation detection step of detecting an operation of providing an instruction to execute a predetermined control based on an image of at least the overlapping part in a captured image of each of a plurality of the projection ranges which are imaged by the imaging unit and have the overlapping part in common, and a control step of executing the predetermined control in a case where it is determined that the operation is performed in the operation detection step.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2019-198646) filed on Oct. 31, 2019, the content of which is incorporated in the present application by reference.

EXPLANATION OF REFERENCES

1: control device
1a: storage medium
P1: first projection apparatus
C1: first imaging unit
P2: second projection apparatus
C2: second imaging unit
10: first projection range
20: second projection range
10A, 20A, 30A: overlapping part
10B, 20B, 30B: non-overlapping part
10G: first divided image
10a: first superimposed region
10b: first non-superimposed region
20G: second divided image
20a: second superimposed region
20b: second non-superimposed region
CP1, CP2, CP3, CP4: captured image D: display data
D1: first display data
D2: second display data
J1: joined image
JP: image
CTR: operating part
CTR1: first operating part
CTR2: second operating part
P3: third projection apparatus
C3: third imaging unit
P4: fourth projection apparatus
C4: fourth imaging unit
30: third projection range
40: fourth projection range
50: common region
100A, 100B, 100: projection system
SC: screen

What is claimed is:

1. A control device of a projection system including a plurality of projection units and a plurality of imaging units that image a projection range of each of the plurality of projection units, the projection range of each of the plurality of projection units including an overlapping part partially overlapping with the projection range of other projection unit, the control device comprising:
   an operation detection unit that detects an operation of providing an instruction to execute a predetermined control from an image of the overlapping part imaged by the imaging unit; and
   a control unit that executes the predetermined control in response to the operation detection unit detecting the operation,
   wherein the overlapping part is imaged by the plurality of imaging units that image the overlapping part in common at different timings.

2. The control device according to claim 1,
   wherein the projection system includes a plurality of sets of the projection unit and the imaging unit that images the projection range of the projection unit.

3. The control device according to claim 2,
   wherein, in a case where the projection unit of a set among the plurality of sets forms the overlapping part in common with the projection unit of another set among the plurality of sets, the set and the another set form a combination, and
   the operation detection unit detects the operation from the image of the overlapping part captured by the combination of the plurality of sets.

4. The control device according to claim 3,
   wherein the image captured by each imaging unit of the combination is obtained by imaging at different timings.

5. The control device according to claim 4,
   wherein a difference between the timings at which the image is captured by each imaging unit of the combination is less than or equal to a threshold value.

6. The control device according to claim 3,
   wherein the combination includes all of the plurality of sets.

7. The control device according to claim 3,
   wherein the operation detection unit generates a joined image obtained by joining the images of at least the overlapping part in the image captured by each imaging unit of the combination and detects the operation based on the joined image.

8. The control device according to claim 7,
   wherein the operation detection unit generates the joined image by adding the image of at least the overlapping part in the image captured by each imaging unit of the combination.

9. The control device according to claim 7,
   wherein the operation detection unit determines necessity of generating the joined image and generates the joined image in a case where it is determined that the generation is necessary.

10. The control device according to claim 9,
    wherein the operation detection unit determines that the generation of the joined image is necessary in response to a specific image being included in the overlapping part in the image captured by each imaging unit of the combination.

11. The control device according to claim 9,
    wherein the operation detection unit determines that the generation of the joined image is necessary in response to a specific image being included in the overlapping part in the image captured by the imaging unit of any one of all of the plurality of sets.

12. The control device according to claim 10,
    wherein the specific image is an icon included in an image projected from the projection unit.

13. The control device according to claim 10,
    wherein the specific image is an object present between the projection unit and the projection range.

14. The control device according to claim 9,
    wherein in a case where the total number of the plurality of sets exceeds a threshold value, the operation detection unit omits determination processing of the necessity of generating the joined image and generates the joined image without performing the determination processing.

15. The control device according to claim 3,
    wherein the operation detection unit performs acquisition of the captured images from the imaging units of the combination and detection of the operation in parallel.

16. A projection apparatus comprising:
    the control device according to claim 1;
    the plurality of projection units; and
    the plurality of imaging units.

17. A control method of a projection system including a plurality of projection units and a plurality of imaging units that image at least a projection range of each of the plurality of projection units, the projection range of each of the plurality of projection units including an overlapping part partially overlapping with the projection range of other projection unit, the control method comprising:
    an imaging step of imaging the overlapping part in common by the plurality of imaging units at different timings;
    an operation detection step of detecting an operation of providing an instruction to execute a predetermined control from an image of the overlapping part captured; and
    a control step of executing the predetermined control in response to the operation being detected in the operation detection step.

18. The control method according to claim 17,
    wherein the projection system includes a plurality of sets of the projection unit and the imaging unit that images the projection range of the projection unit.

19. The control method according to claim 18,
    wherein, in a case where the projection unit of a set among the plurality of sets forms the overlapping part in common with the projection unit of another set among the plurality of sets, the set and the another set form a combination, and in the operation detection step, the operation is detected from the image of the overlapping part captured by the combination of the plurality of sets.

20. The control method according to claim 19, wherein the image captured by each imaging unit of the combination is obtained by imaging at different timings.

21. The control method according to claim 20, wherein a difference between the timings at which the image is captured by each imaging unit of the combination is less than or equal to a threshold value.

22. The control method according to claim 19, wherein the combination includes all of the plurality of sets.

23. The control method according to claim 19, wherein in the operation detection step, a joined image obtained by joining the images of at least the overlapping part in the image captured by each imaging unit of the combination is generated, and the operation is detected based on the joined image.

24. The control method according to claim 23, wherein in the operation detection step, the joined image is generated by adding the image of at least the overlapping part in the image captured by each imaging unit of the combination.

25. The control method according to claim 23, wherein in the operation detection step, necessity of generating the joined image is determined, and the joined image is generated in a case where it is determined that the generation is necessary.

26. The control method according to claim 25, wherein in the operation detection step, it is determined that the generation of the joined image is necessary in response to a specific image being included in the overlapping part in the image captured by each imaging unit of the combination.

27. The control method according to claim 25, wherein in the operation detection step, it is determined that the generation of the joined image is necessary in response to a specific image being included in the overlapping part in the image captured by the imaging unit of any one of all of the plurality of sets.

28. The control method according to claim 26, wherein the specific image is an icon included in an image projected from the projection unit.

29. The control method according to claim 26, wherein the specific image is an object present between the projection unit and the projection range.

30. The control method according to claim 25, wherein in the operation detection step, in a case where the total number of the plurality of sets exceeds a threshold value, determination processing of the necessity of generating the joined image is omitted, and the joined image is generated without performing the determination processing.

31. The control method according to claim 19, wherein in the operation detection step, acquisition of the captured images from the imaging units of the combination and detection of the operation are performed in parallel.

32. A non-transitory computer readable medium storing a control program of a projection system including a plurality of projection units and a plurality of imaging units that image a projection range of each of the plurality of projection units, the projection range of each of the plurality of projection units including an overlapping part partially overlapping with the projection range of the other projection unit, the control program causing a computer to execute:

an imaging step of imaging the overlapping part in common by the plurality of imaging units at different timings;

an operation detection step of detecting an operation of providing an instruction to execute a predetermined control from an image of the overlapping part captured; and a control step of executing the predetermined control in response to the operation being detected in the operation detection step.

* * * * *